United States Patent
Grinkemeyer et al.

(10) Patent No.: US 11,226,883 B2
(45) Date of Patent: Jan. 18, 2022

(54) SECURE METHOD FOR MANAGING A VIRTUAL TEST PLATFORM

(71) Applicant: Spirent Communications, Inc., San Jose, CA (US)

(72) Inventors: Douglas Grinkemeyer, Germantown, MD (US); David Dailey, Boyds, MD (US); Kevin Myers, Telford, PA (US); Daniel Abarbanel, Waynesboro, PA (US)

(73) Assignee: Spirent Communications, Inc., San Jose, CA (US)

( * ) Notice: Subject to any disclaimer, the term of this patent is extended or adjusted under 35 U.S.C. 154(b) by 112 days.

(21) Appl. No.: 16/841,623

(22) Filed: Apr. 6, 2020

(65) Prior Publication Data

US 2020/0233768 A1    Jul. 23, 2020

Related U.S. Application Data

(63) Continuation of application No. 15/919,039, filed on Mar. 12, 2018, now Pat. No. 10,613,958.

(51) Int. Cl.
*G06F 9/455*       (2018.01)
*G06F 11/30*       (2006.01)
(Continued)

(52) U.S. Cl.
CPC ........ *G06F 11/301* (2013.01); *G06F 9/45558* (2013.01); *H04L 43/50* (2013.01);
(Continued)

(58) Field of Classification Search
CPC .................................................. G06F 9/45558
See application file for complete search history.

(56) References Cited

U.S. PATENT DOCUMENTS 8,711,708 B2    4/2014   Wallman
9,485,165 B2   11/2016   Allan et al.
(Continued)

FOREIGN PATENT DOCUMENTS

CN        106534230 A     3/2017
EP          3099016 A1   11/2016

OTHER PUBLICATIONS

Yang by example, https://trac.ietf.org/trac/edu/raw-attachment/wiki/IETF94/94-module-2-yang.pdf, Nov. 5, 2015, 35 pages.
(Continued)

*Primary Examiner* — Charlie Sun
(74) *Attorney, Agent, or Firm* — Haynes Beffel & Wolfeld LLP; Andrew Dunlap

(57) ABSTRACT

The technology disclosed relates to implementing a virtual test platform (VTP) and running virtual test applications (VTAs) from an unsecured location. Using a phone home service, the VTP establishes a secure tunnel connection with a test controller. The VTP receives configuration information for a VTA from the test controller. If the VTA is not stored on the VTP, the VTP retrieves the VTA from a repository specified by the test controller. The configuration information from the test controller includes information needed for the VTP to set up a second secure tunnel. The VTP establishes the second secure tunnel and launches the VTA. The VTP relays information sent through the second tunnel to the VTA, and also relays messages from the VTA back to the test controller.

20 Claims, 6 Drawing Sheets

(51) Int. Cl.
*H04L 29/06* (2006.01)
*H04L 12/26* (2006.01)

(52) U.S. Cl.
CPC .. *H04L 63/029* (2013.01); *G06F 2009/45587* (2013.01); *G06F 2009/45595* (2013.01)

(56) References Cited

U.S. PATENT DOCUMENTS

| | | | |
|---|---|---|---|
| 9,503,344 | B2 | 11/2016 | Chakrabarti et al. |
| 9,531,621 | B2 | 12/2016 | Kolhi et al. |
| 9,654,370 | B2 | 5/2017 | Welin et al. |
| 2007/0288552 | A1 | 12/2007 | Snyder |
| 2009/0279441 | A1 | 11/2009 | Wong et al. |
| 2009/0285575 | A1 | 11/2009 | Abidi et al. |
| 2013/0088977 | A1 | 4/2013 | Baillargeon |
| 2014/0029441 | A1 | 1/2014 | Nydell |
| 2014/0119221 | A1 | 5/2014 | Park et al. |
| 2014/0169183 | A1 | 6/2014 | Allan et al. |
| 2014/0211636 | A1 | 7/2014 | Robitaille |
| 2014/0226507 | A1 | 8/2014 | Bonnier et al. |
| 2014/0258524 | A1 | 9/2014 | Thyni et al. |
| 2014/0301215 | A1 | 10/2014 | Somoskoi et al. |
| 2015/0056995 | A1 | 2/2015 | Baillargeon |
| 2016/0028603 | A1 | 1/2016 | Chakrabarti et al. |
| 2016/0191367 | A1 | 6/2016 | Mirsky et al. |
| 2016/0218927 | A1 | 7/2016 | Johnsson et al. |
| 2016/0352865 | A1 | 12/2016 | Gupta et al. |
| 2017/0019323 | A1 | 1/2017 | Allan et al. |
| 2018/0165693 | A1 | 6/2018 | Jain et al. |
| 2018/0246803 | A1* | 8/2018 | Zhang ............... G06F 11/3688 |
| 2018/0270149 | A1 | 9/2018 | Jiao et al. |
| 2018/0375753 | A1 | 12/2018 | Mirsky et al. |
| 2019/0059008 | A1 | 2/2019 | Liu |
| 2019/0188108 | A1* | 6/2019 | Jagannathan ....... G06F 11/3414 |

OTHER PUBLICATIONS

"TWAMP Explained Measuring Performance in IP Networks", RAD www.rad.com, Sep. 2014, pp. 1-11.
Mirsky, et al., "Two-Way Active Measurement Protocol (TWAMP) Light Data Model", Network Working Group, Jun. 28, 2016, Internet draft valid for 6 months, http://datatracker.ietf.org/drafts/current/, 21 pages.
Clark, "RFC 813 Window and Acknowledgement Strategy in TCP", MIT Laboratory for Computer Science Computer Systems and Communications Group, Jul. 1982, 22 pages.
"RFC 793—Transmission Control Protocol", Darpa Internet Program, Protocol Specification, Sep. 1981, 90 pages.
Civil, et al., "Two-Way Active Measurement Protocol (TWAMP) Data Model", draft-ietf-ippm-twamp-yang-05, Oct. 18, 2017, Internet draft valid for 6 months, http://datatracker.ietf.org/drafts/current/Draft, 65 pages.
Hedayat, et al., A Two-Way Active Measurement Protocol (TWAMP), Network Working Group, Standards Track, Copyright (c) The IETF Trust (2008), Oct. 2008, 26 pages.
"Zero-touch Network and Service Management—Introductory White Paper", Miscellaneous Contributing Organisations & Authors, available at this link: https://portal.etsi.org/TBSiteMap/ZSM/OperatorWhitePaper, Dec. 7, 2017, 5 pages.
Morton, "RFC 6673 Round-Trip Packet Loss Metrics", ISSN: 2070-1721, AT&T Labs, Internet Engineering Task Force (IETF), https://tools.ietf.org/html/rfc6673, Aug. 2012, 28 pages.
Demichelis, et al., "RFC 3393 IP Packet Delay Variation Metric for IP Performance Metrics (IPPM)", Network Working Group, https://tools.ietf.org/html/rfc3393, Nov. 2002, 42 pages.
Mills, "RFC 1305 Network Time Protocol (Version 3) Specification, Implementation and Analysis", Network Working Group, Electrical Engineering Dept., University of Delaware, mills@udel.edu, Mar. 1992, 115 pages.
"Test and Monitoring Solutions for SDN and DNFV Network Operations", Spirent, spirent.com, Jun. 9, 2016, pp. 1-8.
"Etsi GS NFV-REL 004 V1.1.1", Network Functions Virtualisation (NFV); Assurance; Report on Active Monitoring and Failure Detection, http://www.etsi.org/standards-search, Apr. 2016, pp. 1-61.
Ersue, "ETSI NFV Management and Orchestration—An Overview", IETF #88, Vancouver, Canada, Published E2E Arch, REQ, Use Case,Terminology documents in ETSI NFV Open Area: http://docbox.etsi.org/ISG/NFV/Open/Published/, Jan. 2, 2014, 14 pages.
U.S. Appl. No. 15/936,346—Office Action dated Jun. 21, 2019, 32 pages.
"RFC 5938—Individual Session Control Feature for the Two Way Active Measurement Protocol (TWAMP)", Internet Engineering Task Force (IETF), Aug. 2010, 17 pages.
"RFC 5357—A Two-Way Active Measurement Protocol (TWAMP)", Network Working Group, Oct. 2008, 26 pages.
"DLPs A300 to A399", Cisco ONS 15454 Procedure Guide Release R5.0, Mar. 2005, 102 pages.
"RFC 7750—Differentiated Service Code Point and Explicit Congestion Notification Monitoring", Internet Engineering Task Force (IETF), Feb. 2016, 11 pages.
U.S. Appl. No. 15/919,135—Office Action dated Aug. 15, 2019, 21 pages.
U.S. Appl. No. 15/919,039—Non-Final Office Action dated Nov. 14, 2019, 12 pages.
U.S. Appl. No. 15/919,039—Response to Non-Final Office Action dated Nov. 14, 2019, filed Dec. 27, 2019, 14 pages.
U.S. Appl. No. 15/936,346—Response to Office Action dated Jun. 21, 2019, filed Jan. 7, 2020, 24 pages.
U.S. Appl. No. 15/919,039—Notice of Allowance dated Jan. 17, 2020, 11 pages.
U.S. Appl. No. 15/919,135—Response to Office Action dated Aug. 15, 2019, filed Jan. 17, 2020, 35 pages.
U.S. Appl. No. 15/919,105—Notice of Allowance dated Feb. 7, 2020, 26 pages.
"TWANP Explained Measuring Performance in IP Networks", RAD www.rad.com, Sep. 2014, pp. 1-11.

* cited by examiner

SECURE METHOD FOR MANAGING A VIRTUAL TEST PLATFORM

RELATED APPLICATION(S)

This application is a continuation of U.S. patent application Ser. No. 15/919,039, entitled "SECURE METHOD FOR MANAGING A VIRTUAL TEST PLATFORM", filed 12 Mar. 2018. This application is incorporated by reference for all purposes.

This application is related with U.S. patent application Ser. No. 15/919,105, entitled "ACCELERATION OF NODE CONFIGURATION FOR TWAMP WITH A LARGE NUMBER OF TEST SESSIONS", filed 12 Mar. 2020. The related application is incorporated by reference for all purposes.

This application is related with U.S. patent application Ser. No. 15/919,135, entitled "SCALABILITY AND FAULT TOLERANCE FOR TWAMP WITH A LARGE NUMBER OF TEST SESSIONS", filed 12 Mar. 2020. The related application is incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

New network environments are increasingly using commodity hardware, automating updates and configuration changes, and migrating to elastic cloud-based services that allocate resources adaptively. Building dedicated systems to test these products is becoming more expensive and cumbersome. In order to meet requirements set by network service providers, it is useful for testing service providers to also use standardized and cheap hardware and software components.

An opportunity arises to develop a method that allows network service providers to test their networks using cheap components in a manner that maintains security and allows testing service providers to effectively control deployment of their test components.

DETAILED DESCRIPTION

Figure 1:
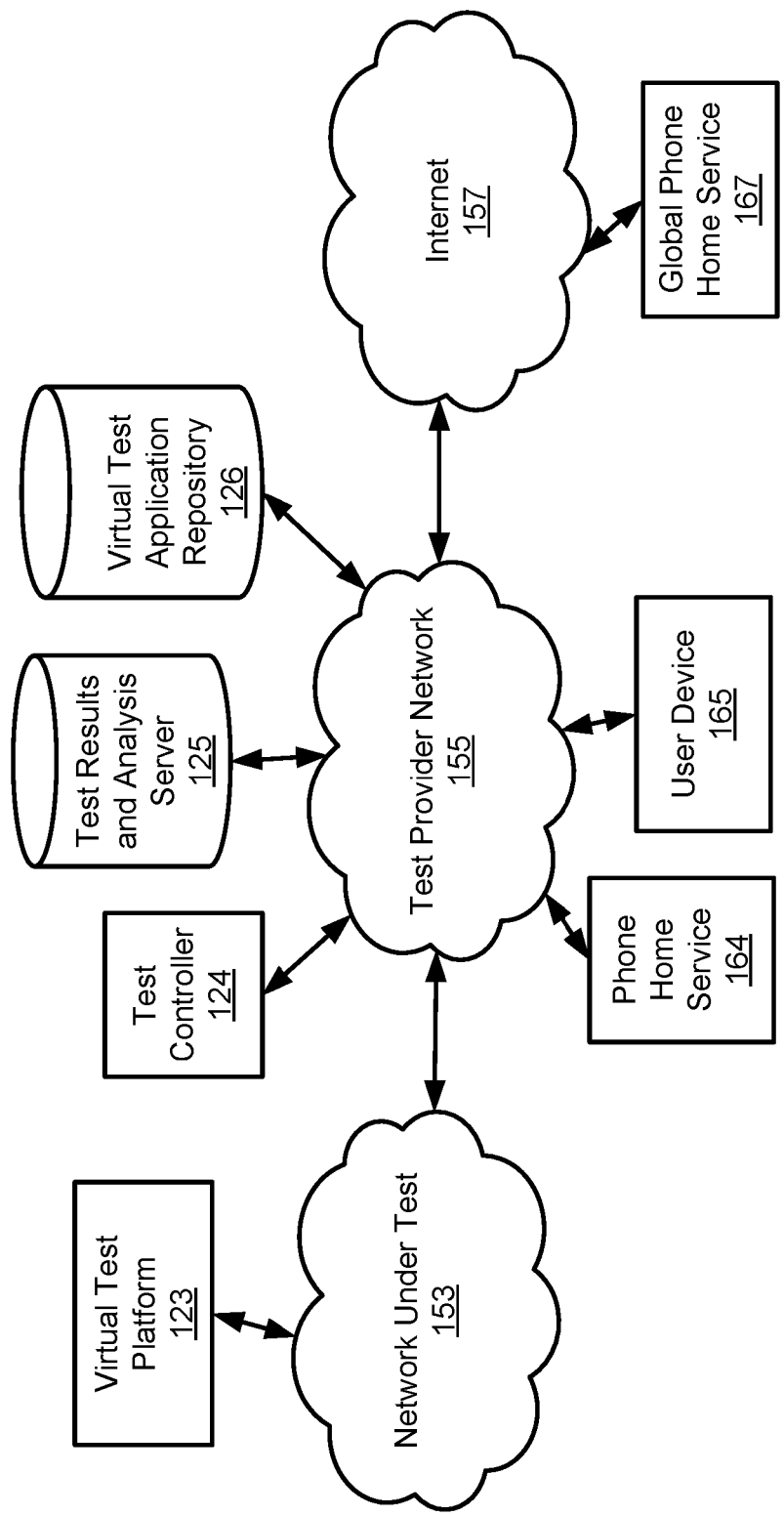
FIG. 1 illustrates a system that allows a system operator to perform tests on a network under test using testing products licensed from a test provider.

The following detailed description is made with reference to the figures. Example implementations are described to illustrate the technology disclosed, not to limit its scope, which is defined by the claims. Those of ordinary skill in the art will recognize a variety of equivalent variations on the description that follows.

In the new virtual environments, expensive dedicated test hardware is out of place. Systems deployed on cheap hardware will be expected to be testable using cheap hardware.

The technology disclosed builds in layers, using Linux and Docker to host individual tests in Docker containers. The hardware is inexpensive, almost disposable. The development of tests, on the other hand, is expensive and therefore requires security to ensure licensed, authorized deployment. The security also enhances test integrity. While this disclosure refers to Linux and Docker, this successful lightweight container model is expected to spawn competing implementations. The technology can be implemented using containers or virtual machines.

The technology disclosed harnesses a two stage secure communication protocol. Loading and invoking a test application, referred to as a virtual test application or VTA, requires instantiation of a secure tunnel, over which instructions for obtaining and parameters for operating the VTA are distributed. Authentication and authorization are required to establish the first tunnel and receive information needed to run a test. A second secure tunnel is necessary to operate the VTA, after instantiation of the test container.

A virtual test platform or VTP that can load and run VTAs in Docker containers is at one end of the first secure tunnel. The VTP sets up the first tunnel before receiving a request to instantiate the VTA, before receiving instructions from the test controller. The VTP is isolated from some attack modes by initiating instead of responding to requests for connection.

The second secure tunnel also begins at the VTP and connects with the test controller, but in a relay mode that enables interaction between the VTA and test controller. The relay mode forwards tunneled communications between the VTA and test controller. Alternatively, the VTA could initiate the second secure tunnel. These configurations ensure that only authenticated users can conduct network tests using licensed test applications.

Many tests can be run on a low powered Linux platform. One hardware configuration that has proven effective and inexpensive is a board packaged in a cellphone-sized enclosure, as pictured in FIG. 3. Alternatively, the VTP can run on existing hardware without greatly taxing the licensee platform to which it is added.

In order to improve security and version control, some of the components used to implement the method operate or are stored on servers maintained by the test developer. These components include controller(s) of tests, repositor(ies) of VTA components, and server(s) that receive and analyze test results. Control of these components by the test developer ensures that the licensee is authenticated and authorized to run VTAs. Alternatively, controller, repository and/or server components could be installed on-site and secured.

FIG. 1 illustrates a system that allows a system operator to perform tests on a network under test 153 using testing applications. Coupled in communication via the network under test 153 is a virtual test platform (VTP) 123. Testing components are coupled in communication via a test provider network 155, which can share components with the network under test 153, and includes a phone home service 164, a user device 165, a test controller 124, a virtual test application (VTA) repository 126, and a test results and analysis server 125. A global phone home service 167 exists on the Internet 157. In some implementations, the system operator may commit to purchase a number of licenses for these services for a fixed period. These components depicted in FIG. 1 are described in the following paragraphs.

The VTP 123 is a computing device that is configured to launch VTAs on the network under test 153. The VTP 123 may be a server, desktop computer, laptop computer, or small single-board computer. In one implementation, the VTP runs a Linux environment with a Docker host that allows it to store VTA images, create containers from stored images, and launch the VTA containers. In other implementations, VTPs may run MICROSOFT® Windows or APPLE® Macintosh environments, either with Docker hosts. Alternative hosts on Linux environments may run the LXC container engines. In addition, the VTP could be hosted on a virtual machine instead of a Docker container engine. The VTP 123 may run multiple VTAs concurrently. The VTP 123 is configured not to accept incoming network connections. The VTP 123 receives incoming traffic over communication channels it establishes, such as secure tunnels. These allow the VTP 123 to be authenticated by the test provider in order to use the test provider's testing services.

The VTP 123 establishes a secure tunnel connection to the test controller 124. The secure tunnel may be, for example, an SSH tunnel. Before the VTP 123 sets up a session with the test controller 124, the VTP 123 generates or retrieves a public-private key pair. The VTP 123 sends credentials to the phone home service 164, which authenticates the VTP. The phone home service 164 provides the VTP 123 with information needed to set up the SSH tunnel with the test controller 124. The VTP 123 establishes the second tunnel with the test controller 124 using the information provided by the phone home service 164. If the SSH connection is interrupted, the VTP 123 re-establishes a connection with the phone home service 164. In some implementations, new keys are generated when the VTP 123 is upgraded.

In some implementations, the VTP 123 performs a certificate exchange with the phone home service 164 to prevent man-in-the-middle attacks. Both VTP 123 and phone home service 164 attach certificates to their public keys. When the VTP 123 and phone home service 164 exchange their public keys, each component can verify a chain of trust for the certificate it receives. A man-in-the-middle attacker would not hold either certificate and would not be able to decrypt messages exchanged by the VTP 123 and phone home service 164.

The phone home service 164 authenticates and then enables the VTP 123 to communicate with the test controller 124. In one implementation, the phone home service 164 resides on the network under test 153 and is accessible by a URL or IP address that is stored by the VTP 123. The stored URL has a default value, but can be configured by the system operator. In some implementations, the phone home service 164 maintains a list of test controllers from which it selects the test controller 124. The phone home service 164 uses a load balancing algorithm or an assignment table to determine which test controller from the list to provide to the VTP 123 to set up the secure tunnel. In this configuration, the system operator can use a local DNS resolver to resolve the URL of the phone home service 164 to an IP address on the network under test 153. The test provider may provide a default URL, which a system operator may change.

The user device 165 enables a user acting on behalf of the system operator to request tests to be performed and view test event data. The user device 165 is a computing device connected to the test provider network 155. The user device 165 runs a browser or other application and provides the user with a software application containing a user interface. A user can request a specific test at the user device 165 after the VTP 123 establishes a first secure tunnel with the test controller 124. After the test is requested at the user device 165, the test controller 124 directs the VTP 123 to launch a VTA over the first secure tunnel. The VTP 123 creates a second secure tunnel in order to relay messages from the test controller 124 to the VTA. During a test session, the user device 165 may receive test session data from the test controller 124 and present it to the user using the user interface. The user device also may receive test result information from the test controller 124, after the test controller 124 receives the test result data from the test results and analysis server 125. In other implementations, the user device 165 may receive test results directly from the test results and analysis server 125.

The test controller 124 controls the configurations of the VTP 123 and VTAs run on the VTP 123. It communicates with VTAs to manage test sessions. In some implementations, the test controller 124 contains storage for VTP and VTA configuration data. In other implementations, the test controller 124 contacts a cloud-based configuration registry to receive the VTP and VTA configuration data. The test controller 124 may connect directly with services on the test provider network 155 using RESTful HTTP requests. The test controller 124 tracks actively running tests on VTAs and creates logs including test session information. The test controller 124 may connect to the test results and analysis server 125 in order to receive test result information. The test controller 124 may provide the test session data and test result information to the user device 165. The test controller 124 may communicate with a service providing a table that matches VTPs available with information regarding what kinds of configuration messages to send to the available VTPs. The test controller maintains static information associated with VTPs, such as part numbers, MAC addresses, and serial numbers.

In some instances, the test controller 124 may concurrently provide instructions for a test to multiple VTAs. For instance, one test may include network monitoring at hundreds of nodes in an extended network, implemented using hundreds of VTPs running instances of a VTA.

The VTA repository 126 stores VTAs. In one implementation, the VTAs are Docker images. The VTA repository 126 restricts access to authenticated and authorized users. In some situations, a specific test application image may not be available on a primary VTA repository 126. The test controller 124 causes the VTA 123 to login to a secondary repository to access the test application image that is not available from the primary VTA repository 126. The VTA repository 126 may serve as an exchange for VTA images written by multiple test providers. These VTAs may be verified and registered by the primary test provider before they are made available to perform tests.

The test results and analysis server 125 receives test data from a launched VTA running on the VTP 123. The test results and analysis server 125 maintains a direct connection to the VTA, which sends the test results and analysis server 125 messages periodically during testing. The test results and analysis server 125 also stores test results. The test results and analysis server 125 presents test results to the user device 165 via the test controller 124. Alternatively, the user could connect to the test results and analysis server 125 directly, rather than through the test controller 124.

The global phone home service 167 on the test provider network 155 allows the test controller 124 and VTP 123 to communicate when a local phone home service cannot be contacted directly. The global phone home service 167 contains a table or other data structure mapping VTPs to local phone home services. The VTP 123 can fall back to contacting the global phone home service 167 when an attempt to contact a local phone home URL fails or it can be configured always to contact global phone home service 167. The global phone home URL receives the VTP's credentials from the phone home service 164 and redirects the set of credentials to the correct phone home URL specified by the table. The global phone home service 167 can also update the default URL of the local phone home service 164 stored on the VTP 123. This allows the VTP 123 to successfully access the local phone home URL without contacting the global phone home service 167. In some implementations, the global phone home service 167 directly provides connection information for the test controller 124, without referral to a local phone home service.

Figure 2:
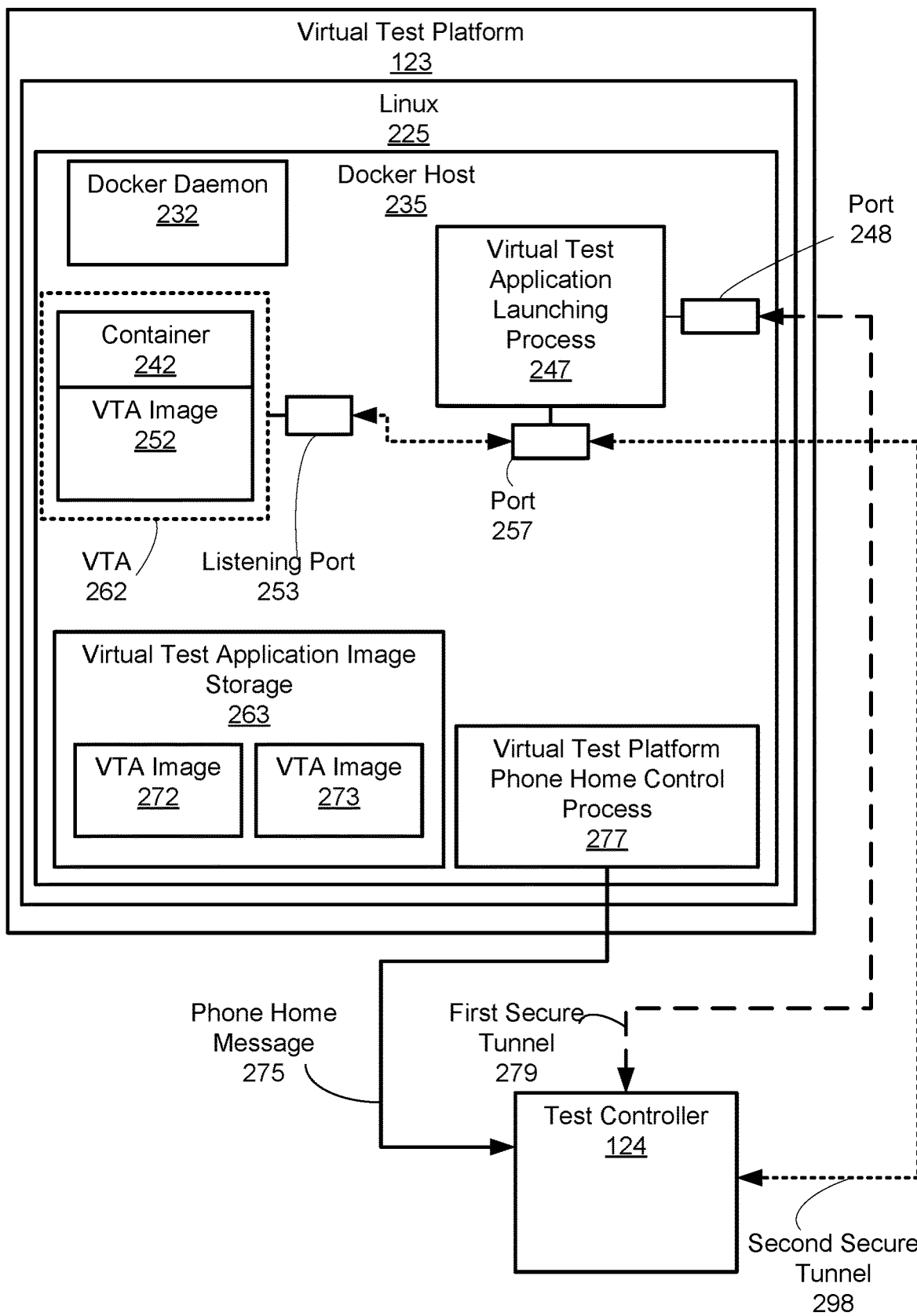
FIG. 2 illustrates a block diagram of the virtual test platform (VTP).

FIG. 2 illustrates a block diagram of one implementation of the virtual test platform (VTP) 123. In this implementation, the VTP 123 runs a Docker host 235 on a Linux operating system 225. In other implementations, the VTP 123 runs a MICROSOFT® Windows or APPLE® Macintosh operating system. The Docker host 235 includes a Docker daemon 232, a virtual test application (VTA) 262, a VTP phone home control process 277, a VTA image storage 263, and a VTA launching process 247.

The Docker host 235 executes a Docker engine on the VTP 123. The Docker host 235 provides storage for Docker images and packages and runs Docker applications within containers. In alternative implementations, the Docker host runs on a server or on a virtual machine installed on a server or other host machine.

The Docker daemon 232 listens for API requests from programs and manages Docker objects running on the Docker host 235. The Docker daemon 232 executes Docker commands when instructed by a Docker client. In this implementation of the test environment, available commands include commands for building, downloading, and executing Docker containers.

The VTA 262 can run in a Docker container and is configured to perform a network test. Many types of network tests are implemented by the VTA 262. A few examples of these tests include Two-Way Active Measurement Protocol (TWAMP) tests, International Telegraph Union Standardization Sector (ITU-T) y.1564 tests, and ITU-T y.1731 tests. TWAMP defines a standard for measuring round-trip network performance among network devices. Key Performance Indicators (KPIs) specified for TWAMP include latency, jitter, the number of lost packets, and the number of out of sequence packets. More information about TWAMP can be found in the Internet Engineering Task Force (IETF) Request for Comment (RFC) 5357. ITU-T y.1564 is a test methodology that assesses the proper configuration and performance of an Ethernet service. KPIs measured by y.1564 testing include bandwidth, latency, frame loss, and packet jitter. ITU-T y.1731 is a performance monitoring test that measures Ethernet frame delay, frame delay variation, throughput, and frame loss. Multiple VTAs may be employed by the test controller 124 in a coordinated test from multiple locations with multiple test criteria or over multiple routes.

The VTA 262 is launched from a VTA image 252 that contains a set of required attributes that are specified when the VTA is launched using the configuration data from the test controller 124. The VTA 262 can use a modeling language (for example, the YANG modeling language) to define these required attributes by defining parameters and putting constraints on acceptable values associated with the defined parameters. Using the modeling language ensures that the test controller 124 does not need to store information about a VTA API. If the test controller 124 needs to access this information, it queries the VTA's API. Configuration data used by the VTA as image parameters alternatively can be encoded using a serialization language. Examples of serialization languages are JSON, XML, and YAML.

The VTA 262 runs a test on the VTP 123. The VTA 262 is a VTA image 252 combined with a container 242 and executed by the VTP 123. The container 242 is a writeable layer that allows the VTA 262 to be modified by configuration data from the test controller 124 and to collect data and manage variables during execution. Configuration data is received by the VTP 123 through the first secure tunnel 279 established by the phone home control process 277. The data is received at a port 248 of the VTA launching process 247. The VTA launching process 247 containerizes a VTA image in order to create the VTA 262 by modifying the image 252 using the configuration data. After the VTA 262 accepts the configuration data, VTP 123 executes the VTA 262 and the VTA 262 receives messages from the test controller 124 through the second secure tunnel 279. The messages are sent from the test controller 124 to the VTA launching process 247 and forwarded from port 257 to the VTA listening port 253.

The VTA 262 communicates with services on both the network under test 153 and the test provider network 155, such as other launched VTAs, the test controller 124, and the test results and analysis server 125, using REST API calls. For example, the VTA 262 sends HTTP POST requests containing test result data to the test results and analysis server 125.

The VTP phone home control process 277 establishes a connection with the local phone home service 164. The VTP phone home control process 277 sends a phone home message 275 to a stored URL. The phone home message 275 is a POST including VTP credential information. This information includes a VTP identifier, an IP address, a MAC address, a VTP part number, a public key, and other authentication information. An example of a VTP POST including this information in JSON format follows:

```
{u'DeviceID': u'123456789',
u'MY_IP': u'192.168.1.171',
u'MAC_Address': u'11:22:33:44:55:66',
u'PARTNUM': u'4444-22222',
u'KEY': 'TOKEN_KEY_STRING',
u'ExtraInfo':'Extra_Auth_info'}
```

Secure tunnel setup information is returned as a POST from the phone home service 164 to the phone home control process 277. This information include an IP address and port for the test controller 124, as well as a user identifier associated with the licensee. A JSON example with these parameters for use in a POST follows:

```
{
    "Connect_to_IP": "1.30.12.6",
    "Port": 1234,
    "User": "token_user"
}
```

The VTP phone home control process 277 uses this information to set up a first secure tunnel 279 with the test controller 124. The phone home control process 277 creates a tunnel endpoint 248 to allow the first secure tunnel 279 to be established between the test controller 124 and the VTA launching process 247. The phone home control process 277 maintains the secure tunnel 279 after establishing the tunnel 279.

The VTA launching process 247 configures both the VTP 123 and a VTA image in order to run a test. The VTA launching process 247 receives RESTful HTTP requests and has write access to VTP system information. The VTA launching process 247 receives VTP configuration commands from the test controller 124. These commands include commands to reboot, upgrade, retrieve configuration information, stop a running VTA, and launch a VTA. The launching process 247 launches a VTA image from the VTA image storage 263, such as the VTA Image 272 or the VTA Image 273. The VTA launching process 247 may also download a VTA from a repository connected to the test provider network 155, such as the VTA repository 126, to the VTA image storage 263.

The VTA launching process 247 establishes a second secure tunnel 298. The second secure tunnel 298 is established to relay messages from the test controller 124 to a launched VTA. The messages are relayed from port 257 to port 253. An example of a relayed communication between the test controller 124 and the VTA 262 is shown, with examples of JSON data structures. The example shows a test that returns the IP addresses of devices on the system operator's network under test 153. Many other types of test are performed by the VTA.

The below URL gives an address for a POST which includes a JSON file configuring the VTA 262 to perform an IP device discovery test and which is made from the test controller 124 to the VTA 262. The POST is made to the local port 1234 on the test controller 124 that is connected to the VTA 262 via the second secure tunnel 298. The path name ip_device_discover signifies that the test returns IP addresses of devices connected to the network under test 153. Other tests use different path names.
 https://localhost:1234/ip_device_discover
The POST message itself contains a list of parameters and associated values in JSON format. The message includes testing user authentication and authorization information as well as device information and test measurement methods. Note that, in this instance, "ControllerID" refers to a machine containing both the test controller 124 and the test results and analysis server 125. The two services are not necessarily located on the same machine. These test parameters and values are shown for this instance of the IP device discovery test. Other tests use different parameters and values.

```
'{"vnfd":{"ControllerID":"http://10.34.222.17:1234/test/foo",
"BackupControllerID":"http://10.34.222.17:1234/test/foo", "AuthUser":"someuser",
"AuthToken":"security_token", "TestGroupID":"123ABC",
"MeasurementMethods":"RFC_6349",
"SecurityCert":"ABCDEF12345"},
"test_parameters":{"ip_interface":"ethernet","subnet":"192.168.1.0","timeout":"30"}}'
```

The VTA 262 responds with a test result message. The message affirms that the test was a success and provides IP addresses of devices discovered on the network under test 153, responsive to the "ip_device_discover" test. The devices, for example, may be computing devices, such as the user device 165. Other tests show different result parameters and values.

```
{
    "result": {
        "status": {
            "success": "OK"
        },
        "result": [
            {
                "mac-address": "48:5d:36:a7:69:e9",
                "ip-address": "192.168.1.1"
            },
            {
                "mac-address": "58:c3:8b:6f:7d:06",
                "ip-address": "192.168.1.152"
            }
        ]
    }
}
```

Figure 3:
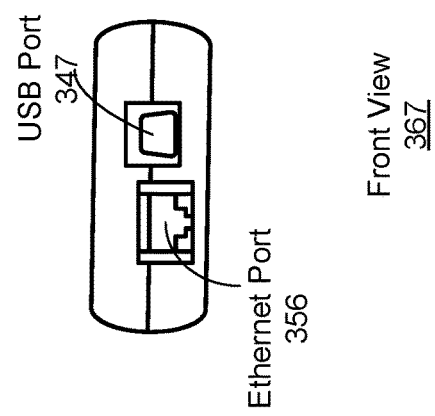
FIG. 3 illustrates a physical example of the VTP hardware.
Figure 3:
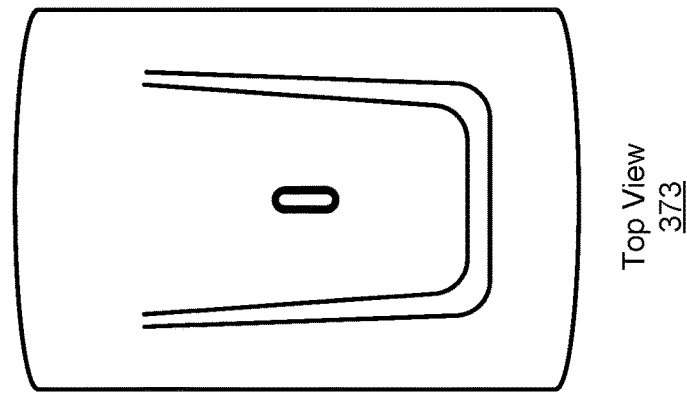

FIG. 3 illustrates sample hardware 300 to run the VTP 123. In this implementation, the VTP is cell-phone sized, or 2.25" by 3". In other implementations, the VTP may be a larger computer device running a Linux environment. A top view 373 and a front view 367 of the enclosure are shown. The physical enclosure includes an Ethernet port 365 and a USB port 347. Both the Ethernet port 365 and USB port 347 allow users to perform administrative tasks on the VTP 123. The Ethernet port 365 additionally allows loaded VTAs to conduct service assurance tests on Ethernet networks, such as y.1564 and y.1731 tests. The USB port 347 additionally allows local users to provision and supply power to the VTP 123.

Figure 4:
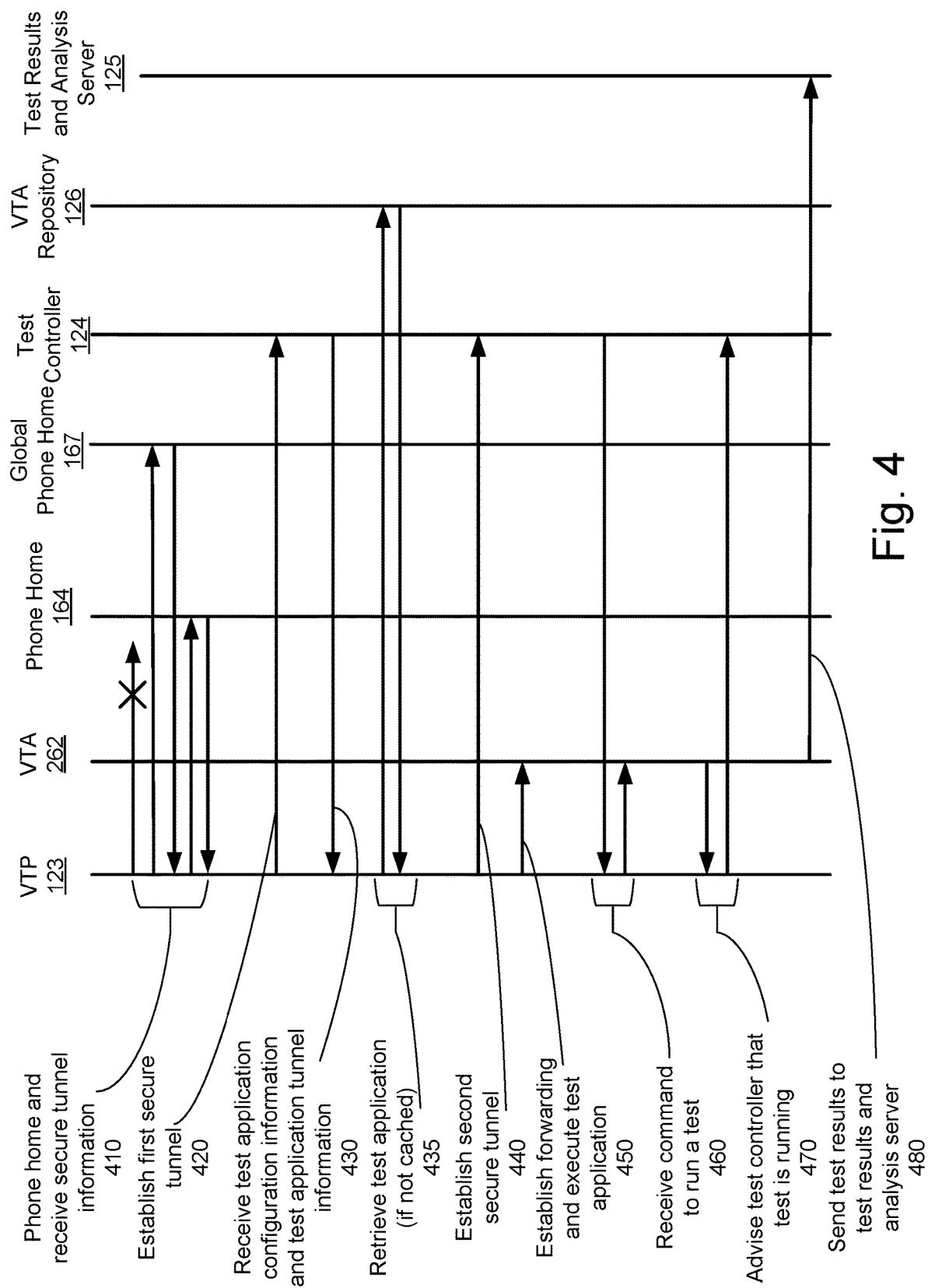
FIG. 4 shows a message flow diagram illustrating a secure process for implementing a test platform and running test applications on a system operator's network.

FIG. 4 shows a message flow diagram illustrating a secure process implemented by a VTP running VTAs. The message flow diagram of FIG. 4 does not show the system operator initiating a test of the network under test 153 from the user device 165.

In step 410, the VTP 123 phones home and receives information regarding how to set up a secure tunnel with the test controller 124. The VTP 123 initiates itself and sends a message to the URL of the phone home service 164. This message contains credentials identifying the VTP 123. These credentials include the VTP's MAC address, serial number, part number, and public key. In the message flow diagram of FIG. 4, the phone home URL stored in the VTP 123 is not resolvable. The VTP 123 contacts the global phone home service 167, which provides the VTP 123 with the correct phone home URL. The VTP 123 sends its credentials to the correct URL. The phone home service 164 provides the VTP 123 with information needed to set up a first secure tunnel with the test controller 124. This information includes an IP address for the test controller 124, a remote tunnel port, and a user identifier. In other implementations, the global phone home service 167 provides the VTP 123 with the first secure tunnel information.

In step 420, the VTP 123 sets up the first secure tunnel to the test controller 124 using the IP address, remote tunnel port, and user identifier provided by the phone home service 164 or the global phone home service 167. This tunnel enables the VTP 123 to receive commands from the test controller 124.

In step 430, the test controller 124 sends the VTP 123 configuration information for a VTA, as well as information necessary to set up a second secure tunnel between the VTP 123 and the test controller 124. Step 435 is executed if a VTA image associated with the configuration information is not stored in the VTA image storage 263 on the VTP 123. In this step, the test controller 124 sends the VTP 123 a command to retrieve a VTA image from a VTA repository, such as the VTA repository 126.

In step 440, the VTP 123 creates the second secure tunnel using the information posted by the test controller 124. The second secure tunnel is established to create a communication channel between the test controller 124 and the stored or retrieved VTA image, once it is launched as the VTA 262.

The VTP 123 can create the second secure tunnel to a test controller that is not the test controller 124. This is done when the test controller 124 needs additional resources in order to provide the VTA 262 with messages. In order to create a secure tunnel with the second test controller, the first test controller sends the VTP's public key to the second test controller using an HTTP request. The test controllers communicate securely on the test provider network 155 because they are behind a firewall maintained by the test provider.

In step 450, the VTP 123 establishes forwarding to the VTA and launches the VTA. The VTP 123 allocates a port to forward data from the second secure tunnel to the VTA. By default, the allocated port is port 443. Additional ports are allocated if multiple VTAs are launched concurrently on the VTP 123. Allocating the port establishes a relay mode wherein the test controller 124 can communicate directly with the launched VTA over the second secure tunnel. The container layer 242 is then applied to the VTA image 252 in order to create the VTA 262. This VTA image may be the image retrieved in step 435. The VTP 123 then executes the containerized VTA 262 using input parameters derived from the configuration data received over the first secure tunnel.

In step 460, the test controller 124 sends the VTA 262 a command to perform a test. In this step, the command is sent through the second secure tunnel from the test controller 124 to the VTP 123. The VTP 123 then relays the command to the VTA 262.

In step 470, the VTA 262 advises the test controller 124 that it has started performing the test. The VTA 262 forwards the VTP 123 the message through the exposed port. The VTP 123 then forwards the message to the test controller 124.

In step 480, the VTA 262 sends the test results and analysis server 125 results. The test application maintains an outgoing connection to the test results and analysis server 125 in order to send results during the duration of the test event.

Figure 5:
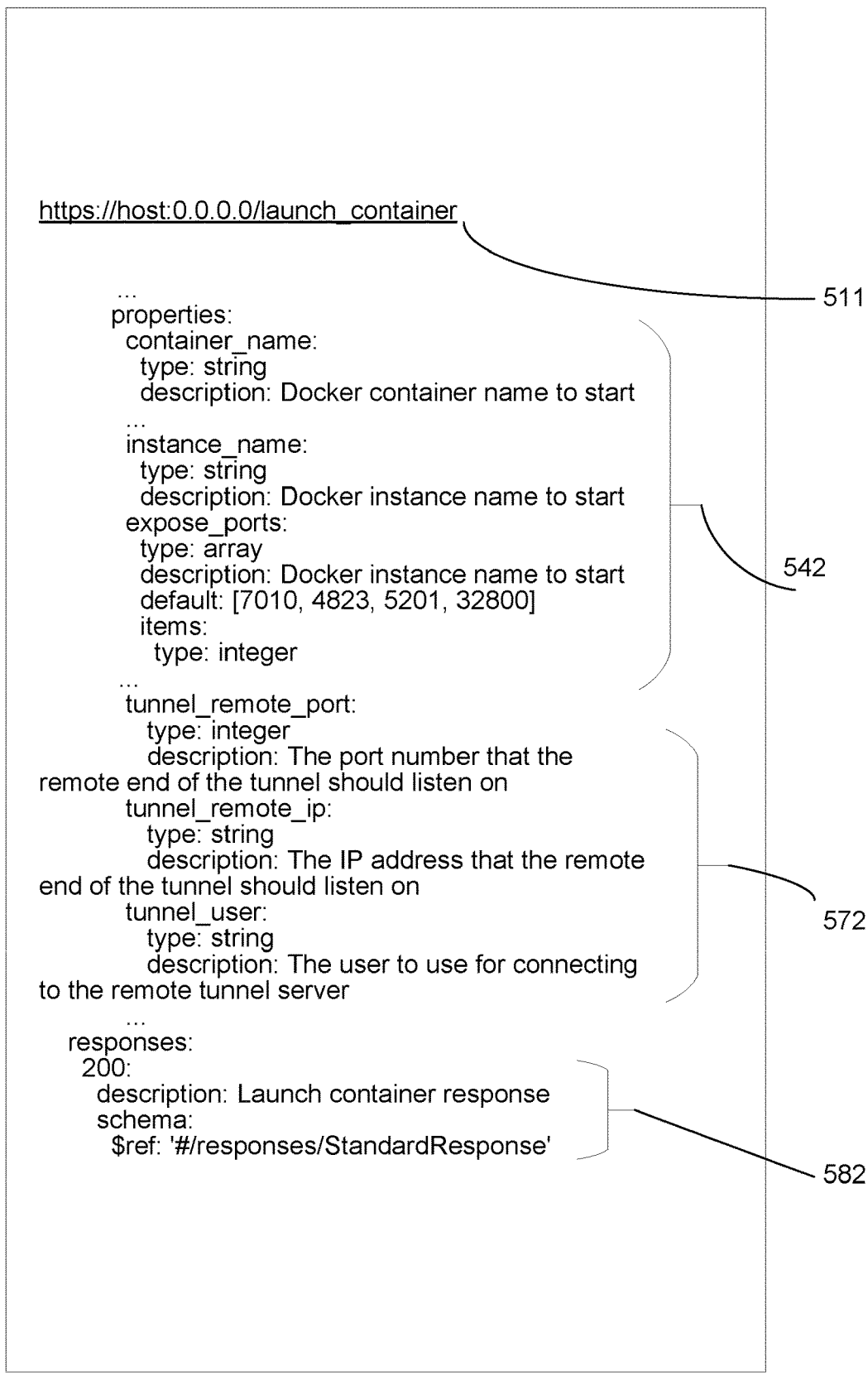
FIG. 5 illustrates an example of a file used by the VTP to manage model definitions used to allow the VTP to execute a launch command.

FIG. 5 illustrates an example of a file used by the VTP 123 to manage model definitions used to allow the VTP 123 to execute a launch command. In this implementation, the file is a YAML schema file. In other implementations, model definitions may be managed using another data serialization language. The model definitions define the parameters and values expected to execute a VTA launch command sent to the VTP 123 by the test controller 124. The model definition management file includes the VTA launch address 511, a set of VTA properties 542, a set of secure tunnel properties 572, and a response parameter 582.

The VTA launch address 511 is a destination for an HTTPS POST from the test controller 124 to the VTP 123. The POST prompts the VTP 123 to launch a VTA that is configured using the set of VTA properties 542. The VTA launch address URL includes a tunnel endpoint IP address and port number, followed by a launch_container path. The test controller 124 POSTs a launch command to its tunnel endpoint, which the secure tunnel forwards to the endpoint of the VTP 123. The VTP 123 containerizes and then executes a VTA using parameters listed in the post's configuration file.

The VTA properties 542 include the parameters container_name, instance_name, and expose_ports, as well as type definitions for values associated with these parameters. More VTA parameters are included in the schema file, but have been omitted here. These parameters include the container entrypoint, which defines a binary file to execute when the container is launched; environment variables; and a directory map, which maps VTA container directories to directories on the host VTP 123. The container_name parameter defines a VTA image that is pulled from the VTA repository 126. In this implementation, the container_name parameter includes a defining the address of the registry from which the VTA image is pulled. The container_name parameter may also include the IP address of the registry from which the container is pulled. The instance_name parameter is the name of a VTA test instance. Specifically, it is the name that is used by the VTP 123 to refer to a VTA after it is executed as a container from the VTA image. It is also used by the VTP 123 to stop the container from running. The expose_ports parameter designates a list of ports to open on the VTA for communication once it is executed. By default, ports are closed on Docker containers. One of the exposed ports is the listening port 253 to which data is relayed from the VTP 123. The other exposed ports are used to carry out testing.

The secure tunnel properties 572 include the parameters tunnel_remote_port, tunnel_remote_IP, and tunnel_user. The tunnel_remote_port parameter defines a TCP port on the test controller that is used to set up the second secure tunnel with the VTP 123. The tunnel_remote_ip parameter designates the IP address of the test controller with which the VTP 123 sets up the second secure tunnel. This test controller may be the test controller 124 or The IP address may belong to a different test controller than the test controller to which the VTP set up the first secure tunnel. The tunnel_user parameter designates the user opening the second secure tunnel.

The response parameter 582 provides an update message to the test controller 124 regarding the status of the VTA launch operation. For example, the message may acknowledge to the test controller 124 that the VTP 123 has successfully launched the VTA 262.

Figure 6:
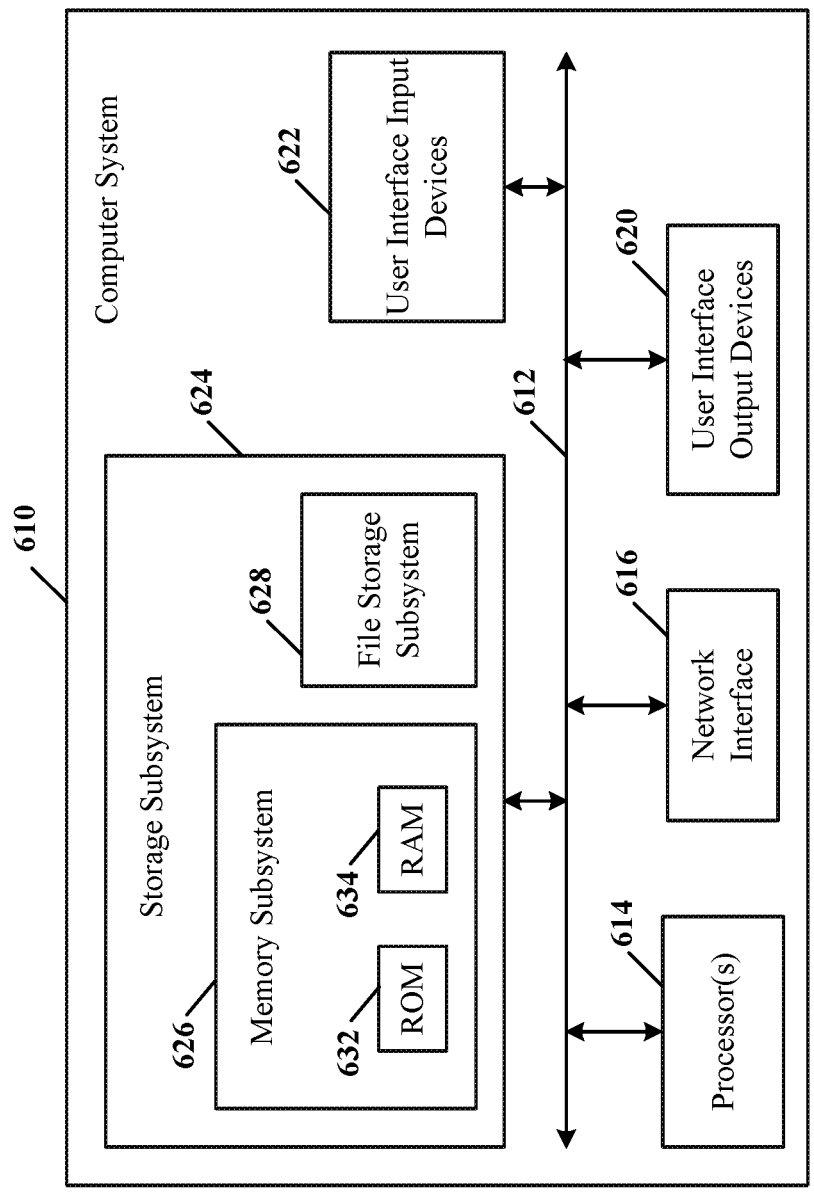
FIG. 6 is a block diagram of an example computer system, according to one implementation.

FIG. 6 is a block diagram of an example computer system, according to one implementation. Computer system 610 typically includes at least one processor 614 that communicates with a number of peripheral devices via bus subsystem 612. These peripheral devices may include a storage subsystem 624 including, for example, memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to corresponding interface devices in other computer systems.

User interface input devices 622 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 614 alone or in combination with other processors.

Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Some Particular Implementations

In one implementation, a disclosed method securely implements a test platform and running test applications from an unsecured location. The method comprises initiating, from the test platform, an authenticated connection with a phone home service. The phone home service is connected to the same network as the test platform, and is accessible via a URL that is stored on the test platform. The test platform receives, from the phone home service, information allowing it to establish a secure tunnel with a test controller. The test platform initiates the secure tunnel with the test controller. It receives an instruction from the test controller to load and prepare a test application. This instruction includes a URL for a repository that stores the test application as an executable component on the test platform. If a current version of the test application is not available to run on the test platform, the test application is retrieved by the test platform from the repository. The test platform establishes a second secure tunnel with the test controller. The second tunnel is configured to allow the test platform to act as a relay and relay communications from the test controller to the test application, and relay communications from the test application to the test controller. The test application performs a requested test under control of the test controller, and sends test results to a test results and analysis server. The test application confirms execution of the test to the test controller.

The first and second secure tunnels can be implemented as SSH tunnels.

The secure tunnel information received by the test platform from the phone home service can include a test controller IP address and port number.

The instruction to load and prepare the test application can further include configuration information for setting up the second secure tunnel.

The configuration information used for setting up the second secure tunnel can include a test application port to which the test platform relays information from the test controller.

The test application port included in the configuration information can be port 443.

The test application can include a Docker image.

Executing the test application can include applying a writeable container layer over the Docker image and modifying attributes of the test application using the configuration information.

Initiating the authenticated connection with the phone home service can include providing the phone home service with a serial number, part number, MAC address, and public key.

The global phone home service can redirect the test platform to a locally resolvable phone home service URL.

The test controller and test results and analysis server can be located on a licensee network, but subject to licensing by a test provider.

The test platform, test application, phone home service, test controller, and test results and analysis server can be configured to communicate using RESTful HTTP requests.

The test platform can re-initiate the authenticated connection with the phone home service in the event of a termination of a secure tunnel.

In another implementation, a disclosed system includes one or more processors coupled to memory, the memory impressed with computer instructions, the instructions, when executed on the processors, implement actions of the disclosed method described supra.

This system implementation and other systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In yet another implementation a disclosed tangible non-transitory computer readable storage medium impressed with computer program instructions to train a deep end-to-end speech recognition model. The instructions, when executed on a processor, implement the disclosed method described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

While the technology disclosed is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method for securely implementing a test platform and running test applications from an unsecured location, the method comprising:
   initiating, from the test platform, an authenticated connection with a phone home service;
   receiving, from the phone home service at the test platform, secure tunnel information for connecting with a test controller;
   initiating a first secure tunnel from the test platform to the test controller;
   receiving an instruction, from the test controller to the test platform, to load and prepare a test application, including a URL for a repository that stores the test application as a component executable on the test platform;
   relaying communications between the test controller and the test application through an established second secure tunnel between (i) the test platform or the test application and (ii) the test controller;
   performing a requested test using the test application under control of the test controller; and
   sending results of the requested test from the test application to a test results and analysis node and confirming execution of the test to the test controller.

2. The method of claim 1, wherein the first and second secure tunnels are SSH tunnels.

3. The method of claim 1, wherein the secure tunnel information received from the phone home service includes a test controller IP address and a test controller port number.

4. The method of claim 1, wherein the instruction to load and prepare the test application further includes configuration information for setting up the second secure tunnel.

5. The method of claim 4, wherein the configuration information includes a test application port to which the test platform relays information from the test controller.

6. The method of claim 4, wherein the test application includes a container image.

7. The method of claim 6, wherein executing the test application includes applying a writeable container layer over the container image and modifying attributes of the test application using the configuration information.

8. The method of claim 1, wherein the test platform is configured not to accept incoming network connections.

9. The method of claim 1, wherein initiating the authenticated connection includes providing the phone home service with a serial number, part number, MAC address, and public key.

10. The method of claim 1, wherein the test platform initiates the authenticated connection with a global phone home service in an event that it does connect to the phone home service.

11. The method of claim 10, wherein the global phone home service redirects the test platform to a locally resolvable phone home service URL.

12. The method of claim 1, wherein the test controller and test results and analysis server are located on a system operator's network, but subject to licensing by a test provider.

13. The method of claim 1, wherein the test platform, test application, phone home service, test controller, and test results and analysis server are configured to communicate using RESTful HTTP requests.

14. The method of claim 1, wherein the test platform re-initiates the authenticated connection with the phone home service in an event of a termination of a secure tunnel.

15. A system comprising:
   memory;
   one or more processors coupled to the memory, the memory being loaded with computer instructions to test mobile devices, the computer instructions, when executed on the one or more processors, implement a method for securely implementing a test platform and running test applications from an unsecured location, the method comprising:
      initiating, from the test platform, an authenticated connection with a phone home service;
      receiving, from the phone home service at the test platform, secure tunnel information for a test controller;
      initiating a first secure tunnel from the test platform to the test controller;
      receiving an instruction, from the test controller to the test platform, to load and prepare a test application, including a URL for a repository that stores the test application as a component executable on the test platform;
      relaying communications between the test controller and the test application through an established second secure tunnel between (i) the test platform or the test application and (ii) the test controller;
      performing a requested test using the test application under control of the test controller; and
      sending results of the requested test from the test application to a test results and analysis node and confirming execution of the test to the test controller.

16. The system of claim 15, wherein the test platform initiates the authenticated connection with a global phone home service in an event that it does connect to the phone home service.

17. The system of claim 15, wherein the test controller and test results and analysis server are located on a system operator's network, but subject to licensing by a test provider.

18. The system of claim 15, wherein the test platform, test application, phone home service, test controller, and test results and analysis server are configured to communicate using RESTful HTTP requests.

19. The system of claim 15, wherein initiating the authenticated connection includes providing the phone home service with a serial number, part number, MAC address, and public key.

20. A non-transitory computer readable storage medium impressed with computer program instructions to test mobile devices, the instructions, when executed on a processor, implement the method of claim 1.

* * * * *